United States Patent [19]
Kuriki

[11] Patent Number: 5,765,105
[45] Date of Patent: Jun. 9, 1998

[54] COMMUNICATION SYSTEM CAPABLE OF USING A PLURALITY OF SUBSCRIBER IDENTITY MEDIA SHARING A SINGLE SUBSCRIBER IDENTITY INFORMATION

[75] Inventor: Shigeya Kuriki, Tokyo, Japan

[73] Assignee: OKI Electric Industry Co., Ltd., Tokyo, Japan

[21] Appl. No.: 554,824

[22] Filed: Nov. 7, 1995

[30] Foreign Application Priority Data

Nov. 7, 1994 [JP] Japan .................. 6-272258

[51] Int. Cl.$^6$ .................................................. H04M 11/00
[52] U.S. Cl. .................................................. 455/410
[58] Field of Search .................. 379/58, 59; 455/89, 455/88, 33.1, 410, 411, 551, 552, 422

[56] References Cited

U.S. PATENT DOCUMENTS

| | | | |
|---|---|---|---|
| 5,337,345 | 8/1994 | Cassidy et al. | 455/410 |
| 5,537,474 | 7/1996 | Brown et al. | 455/411 |

FOREIGN PATENT DOCUMENTS

| | | | |
|---|---|---|---|
| 467534 | 1/1992 | United Kingdom | 379/104 |
| WO 94/08433 | 4/1994 | WIPO | 379/104 |

OTHER PUBLICATIONS

"Network Architecture", Recommendation GSM 03.02, 17 pp. 1-17, Released by: ETSI/PT 12, Release Date: Jan. 1990.

*Primary Examiner*—William Cumming
*Assistant Examiner*—Myron K. Wyche
*Attorney, Agent, or Firm*—Spencer & Frank

[57] ABSTRACT

In a communication system, a plurality of subscriber identity modules implemented as cards and to be mounted to mobile stations (MSs) share a single international mobile subscriber identity (IMSI). When any one of the MSs generates an authentication and registration request, a mobile services switching center (MSC) at a home station writes information representative of the combination of the identity IMSI and an international mobile equipment identity IMEI attached to the mobile station in a home location register. When any one of the MSs generates a call origination request or when a call termination request meant for any one of them is generated, the MSC at a home station or an MSC at a roamer station provides the requested service only if combination information relating to the mobile station is stored in the home location register or a visitor location register.

5 Claims, 2 Drawing Sheets

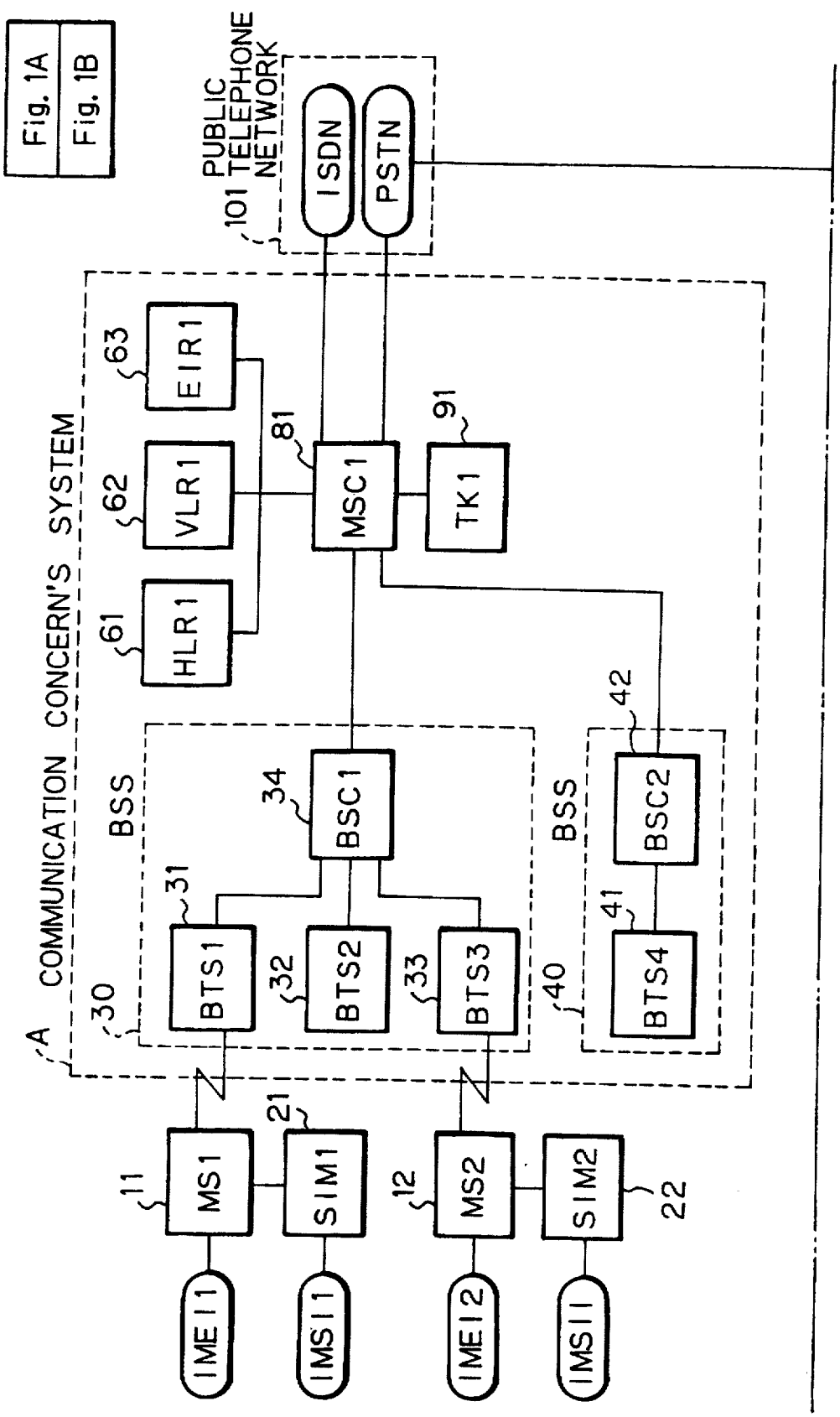

COMMUNICATION SYSTEM CAPABLE OF USING A PLURALITY OF SUBSCRIBER IDENTITY MEDIA SHARING A SINGLE SUBSCRIBER IDENTITY INFORMATION

BACKGROUND OF THE INVENTION

1. Field of the Invention

The present invention relates to a communication system using a subscriber identity medium to which subscriber identity information is assigned, and capable of determining whether or not a person requesting a communication service is a subscriber on the basis of the medium.

2. Description of the Background Art

A digital cellular mobile phone system called GSM (Global System for Mobile Communications) is now available in Europe and uses a subscriber identity module (SIM). The GSM system determines, via the SIM, whether or not a person requesting a communication service is a subscriber qualified to receive telephone services which the system provides. The SIM is implemented as a card having a semiconductor memory, microprocessor and other constituents therein, and having a function of storing information relating to the subscriber and a computing function. The card has substantially the same size as an ordinary credit card.

The information relating to the subscriber are generally classified into two kinds, i.e., one identifying the subscriber, and the other needed by the subscriber. The information identifying the subscriber are a subscriber's telephone number or international mobile subscriber identity (IMSI), a subscriber's password number or personal identification number (PIN), a home network number or public land mobile network (PLMN) number representative of a home network in which the subscriber is registered, and a coded key number necessary for authentication. The information needed by the subscriber include speed call numbers representative of the telephone numbers which the subscriber dials often.

The subscriber of the GSM system carrying the SIM may mount it to a mobile phone or mobile station (MS) in order to obtain call origination, call termination and conversation services. This can be done on practically any kind of MS adaptive to the telephone services of the GSM system, and at practically any place where the telephone services are available. Hence, the subscriber can receive the telephone services only if the SIM is issued to the subscriber by a communication concern, i.e., without purchasing any MS. In this case, charges for calls are stored in a charge register corresponding to the IMSI stored in the SIM. With a conventional mobile phone system, a subscriber intending to take a business trip or otherwise and go out to a remote place must carry the MS. By contrast, with the GSM system, such a subscriber has only to, e.g., borrow an MS from a friend or rent it from a communication concern on the spot.

However, the problem with the GSM system is that two or more cards sharing a single IMSI are not issued. Hence, assuming, e.g., a family subscribing the telephone services of the GSM system and sharing a single SIM, then if one member of the family goes out to a remote place with the SIM, the other members cannot receive the telephone services at all. This problem will be eliminated if two SIMs each having a particular IMSI are issued to a single family. This, however, brings about another problem that a minimum charge must be paid for each IMSI, resulting in a high telephone rate. In light of this, it is desirable that even when one member of a family goes out with an SIM, the other members can receive the telephone services without paying any extra rates.

SUMMARY OF THE INVENTION

It is, therefore, an object of the present invention to provide a communication system which permits, even when one member of a family goes out with an SIM, the other members to receive services without paying any extra rates.

In accordance with the present invention, in a communication system using a subscriber identify medium to which subscriber identify information is assigned, and determining whether or not a person requesting a communication service is a subscriber on the basis of the medium, an information holding device holds combination information representative of the combination of the subscriber identify information and terminal identify information for identifying a communication terminal to which the medium is mounted. A service providing device provides, in response to a communication service request, a requested communication service only if combination information relating to the communication service request is held by the information holding device.

The above object of the invention may also be achieved if a plurality of subscriber identity media having a single subscriber identity information are issued. However, this kind of scheme, simply assigning the same subscriber identity information to a plurality of media, prevents persons each having the respective media from receiving a communication service at the same time. This is because the media are administered on the basis of only the subscriber identity information. In light of this, the system of the invention supervises a plurality of subscriber identity media on the basis of the combination of the subscriber identity information and the terminal identity information. This successfully distinguishes a plurality of media sharing a single subscriber identity information even when they are used at the same time, because particular identity information is attached to each communication terminal to which the media may be mounted.

Why the GSM system issues a single SIM having a particular IMSI to a given group of people is simply that it follows the conventional single terminal, single subscriber number principle in the system design aspect. Therefore, the precondition of the invention that a plurality of subscriber identity media sharing a single subscriber identity information be issued does not obstruct the application of the invention to the GSM system at all.

BRIEF DESCRIPTION OF THE DRAWINGS

The objects and features of the present invention will become more apparent from the consideration of the following detailed description taken in conjunction with the accompanying drawings in which:

FIG. 1 shows how FIGS. 1A and 1B are connected; and

FIGS. 1A and 1B are, when combined as shown in FIG. 1, a block diagram schematically showing a communication system embodying the present invention.

DESCRIPTION OF THE PREFERRED EMBODIMENT

Figure 1B:
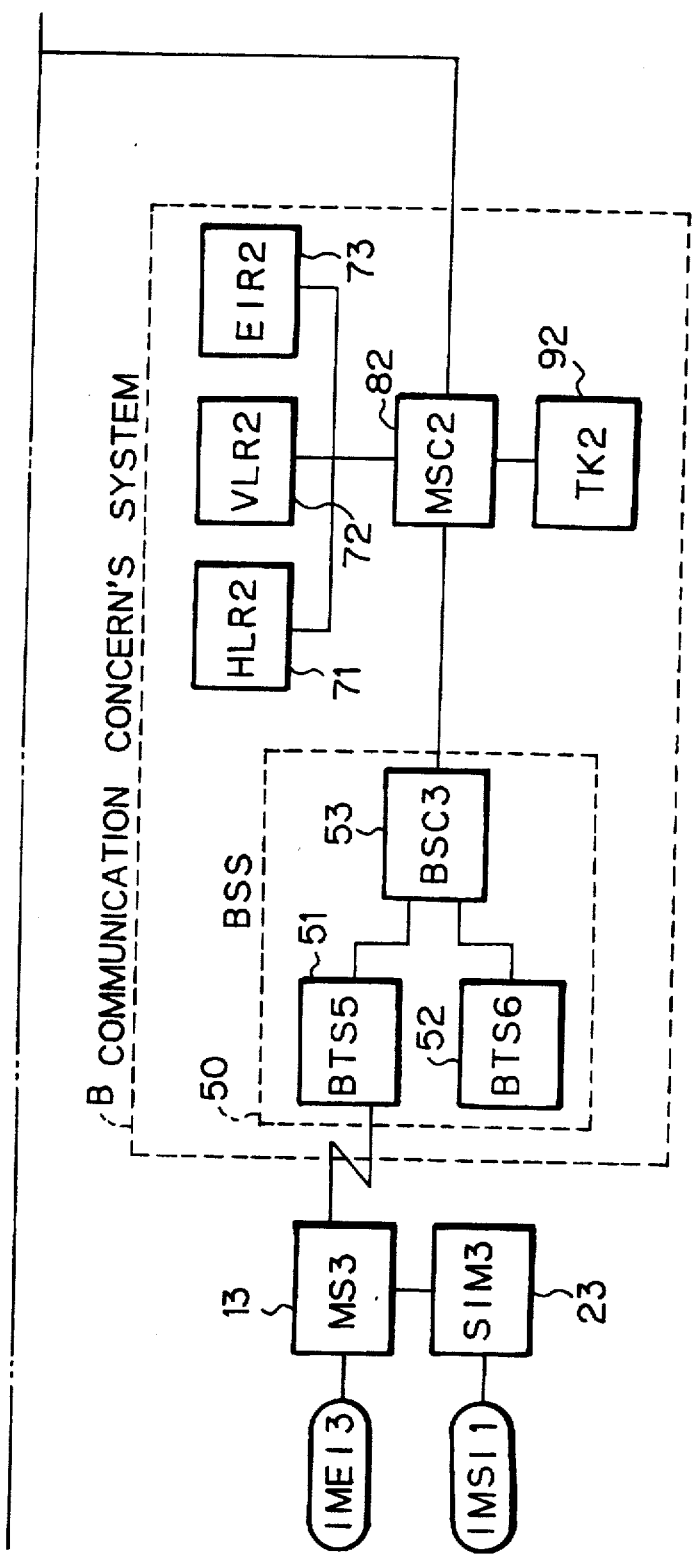

A communications system embodying the present invention and applied to the GSM system by way of example will be outlined first. In the GSM system, a subscriber's telephone number or IMSI is not assigned to a mobile station, but it is assigned to a subscriber identification card or SIM, as stated earlier. A subscriber is therefore identified on the basis of an SIM. When a subscriber carrying an SIM mounts it to a mobile station or MS and then switches on the MS, an IMSI stored in the SIM is sent to a communication concern's system. In response, the concern's system determines whether or not the IMSI is an authenticated number. If the IMSI is an authenticated number, the concern's system registers it thereat. Then, the subscriber can receive the telephone services of the GSM system with the MS to which the SIM is mounted.

A particular terminal identification number or international mobile equipment identity (IMEI) is assigned to each MS. The IMEI is sent to the communication concern's system together with the IMSI when the MS is switched on. Paying attention to this point, the embodiment to be described holds the IMSI and IMEI combination sent from the MS and determines, in response to a call origination or termination request, whether or not to accept it on the basis of the above combination. In this constitution, even when a plurality of SIMs to which a single IMSI is assigned are used at the same time, they can be distinguished from each other because a particular IMEI is assigned to each MS. This permits persons each using one SIM to receive the telephone services at the same time.

Referring to FIG. 1A and 1B, the embodiment outlined above will be described in detail. As shown, the communication system includes MSs 11, 12 and 13. Different IMEIs 1, 2 and 3 are assigned to the MSs 11, 12 and 13, respectively. SIMs 21, 22 and 23 are shown as being mounted to the MSs 11, 12 and 13, respectively. A single IMSI1 is stored in all the SIMs 21, 22 and 23. Base station systems (BSSs) 30, 40 and 50 each has one or more base transceiver stations (BTSs) and a base station controller (BSC) for controlling the BTSs. In the illustrative embodiment, the BSS 30 has three BTSs 31, 32 and 33 and a BSC 34, the BSS 40 has a single BTS 41 and a BSC 42, and the BSS 50 has two BTSs 51 and 52 and a BSC 53, although such numbers are only illustrative.

Home location registers (HLRs) 61 and 71 each stores information relating to subscribers, while visitor location registers (VLRs) 62 and 72 each stores information relating to visitors. Equipment identity registers (EIRs) 63 and 73 each stores IMEIs. Preferably, these registers are implemented by semiconductor memory devices, i.e., RAMs (Random Access Memories) including SRAMs (Static RAMs) and DRAMs (Dynamic RAMs), magnetic disk devices, etc. A mobile services switching center (MSC) 81 or MSC1 performs various kinds of functions by referencing the information stored in the HLR 61, VLR 62, and EIR 63. For example, the MSC 81 supervises and controls the MSs 11 and 12, controls handovers within the system, and controls roamer subscribers from the other systems. Likewise, an MSC 82 or MSC2 supervises and controls the MS 13, controls handovers within the system, and controls roamer subscribers from the other systems, based on the information stored in the HLR 71, VLR 72, and EIR 73. In practice, the control over the MSs 11–13, handovers and roaming is executed by exchanges installed in the MSCs 81 and 82.

In FIGS. 1A and 1B, the HLRs 61 and 71, VLRs 62 and 72, and EIRs 63 and 73 are shown as being located outside of the MSCs 81 and 82. Alternatively, these registers or memories may be incorporated in the MSCs 81 and 82, if desired. For example, they may be built in the exchanges respectively installed in the MSCs 81 and 82. Also, these memories are shown as being concentratedly arranged at a single location in a single communication concern's system, thereby concentratedly administering subscriber information, visitor information, and IMEIs. Alternatively, the memories may be arranged at a plurality of different locations in a single communication concern's system.

Talkie devices 91 and 92 are used to output various kinds of audible messages. A public telephone network 101 is implemented as an integrated digital services network (ISDN) or a public switched telephone network (PSTN).

In FIG. 1, the BSSs 30 and 40, HLR 61, VLR 62, EIR 63, MSC 81 and talkie device 91 constitute a system A belonging to one communication concern or common carrier. Likewise, the BSS 50, HLR 71, VLR 72, EIR 73, MSC 82 and talkie device 92 constitute a system B belonging to another communication concern. The communication system of the present invention is made up of one of the systems A and B, and the MSs connected thereto. Alternatively, the system of the present invention may be made up of both of the systems A and B and all the MSs connected thereto.

The communication system having the above architecture will be operated as follows. Assume that the SIMs 21 and 22 are located at a home station while the SIM 23 is located at a roamer station. In this condition, for the IMSI1, for example, the concern's system A is the system of a home station while the concern's system B is the system of a roamer station. The words "home station" refer to a station which can authenticate a given IMSI, and the words "roamer station" refer to a station which cannot do so.

Control procedures to be executed in response to authentication and registration requests, or simply registration requests as referred to hereinafter, from the MSs 11, 12 and 13 are as follows. First, assume that the MS 11 generates a registration request. When the MS 11 loaded with the SIM 21 is switched on, the MS 11 searches the three BTSs 31, 32 and 33 by using a broadcasting control channel (BCCH) in order to select one of them with which the receiving sensitivity is highest. FIG. 1 shows a specific condition wherein the MS 11 has selected the BTS 31 by way of example.

The MS 11, having selected the BTS 31, sends a registration request signal to the BTS 31. The registration request signal contains the IMSI1 stored in the SIM 21, the IMEI1 attached to the MS 11, and other necessary information. The registration request is sent over a random access channel (RACH) which the BTS 31 designates over a control channel. On receiving the registration request, the BTS 31 transfers it to the BSC 34. The BSC 34, in turn, sends the registration request to the MSC 81. In response, the MSC 81 scans the HLR 61 and EIR 63 in order to determine whether or not the IMSI1 and IMEI1 contained in the input signal are authentic, i.e., whether or not they are registered at the memories 61 and 63. Because the concern's system A is assumed to be a home system for the IMSI1, the MSC 81 determines that the IMSI1 is authentic. Assuming that the IMEI1 is also authentic, then the MSC 81 reports the MS 11 via the BSC 34 and BTS 31 that the MSC 81 will accept registration. Subsequently, the MSC 81 registers information representative of the IMSI1 and IMEI1 combination at an authentication registration area defined in the HLR. The user of the SIM 21 can now receive call origination, call termination and conversation services.

The above control procedure will also be executed when the MS 12 generates a registration request, although it will not be described specifically in order to avoid redundancy. A registration request signal from the MS 12 will be routed through, e.g., the BTS 33 and BSC 34 to the MSC 81.

When the MS 13 situated at the roamer station generates a registration request, the following control procedure is executed. In this case, a registration request signal from the MS 13 is sent to the MSC 82 by way of, e.g., the BTS 51 and BSC 53. This part of the procedure is the same as with the registration request from the MS 11 and will not be described specifically. On receiving the registration request signal, the MSC 82 determines whether or not the IMSI1 is authentic for the MSC 82. Because the concern's system B is assumed to be a roamer system for the IMSI1, the MSC 82 determines that the IMSI1 is not authentic.

The MSC 82, which received the unauthentic IMSI1, queries the MSC 81 of the home station at which the IMSI1 is authenticated. Subsequently, the MSC 82 inquires of the MSC 81 whether or not the IMSI1 is authenticated thereby via, e.g., the public telephone network 101. In response, the MSC 81 scans the HLR 61 to see if the IMSI1 is authentic. In this case, the MSC 81 determines that the IMSI1 is authentic because the concern's system A is a home system for the IMSI1. Then, the MSC 81 reports to the MSC 82 that the IMSI1 is authentic. In response, the MSC 82 writes information representative of the IMSI1 and IMEI3 combination in the VLR 72 included in the system B. Subsequently, the MSC 82 reports to the MS 13 that it accepts the registration, via the BSC 53 and BTS 51. This offers telephone services to the person using the SIM 23, i.e., a roamer subscriber or visitor to receive telephone services at an area other than its registered area.

As the MSC 82 sends the IMSI1 and IMEI3 to the MSC 81 at the time of the above inquiry, the MSC 81 registers the IMSI1 and IMEI3 combination at the registration area available in the HLR 61. As a result, the MSC 81 recognizes that the MS 13 loaded with the SIM 23 is operating with the IMSI1 and IMEI3 combination in a roamer area.

By the authentication and registration procedures described above, information representative of the following three different combinations are written to the registration area of the HLR 61 included in the concern's system or home system A:

MS 11: IMSI1+IMEI1=IMSI#1
MS 12: IMSI1+IMEI2=IMSI#2
MS 13: IMSI1+IMEI3=IMSI#3

In the other concern's system or roamer system B, information representative of the following single combination is written to the VLR 72:

MS 13: IMSI1+IMEI3=IMSI#3

It is to be noted that IMSI#1, IMSI#2 and IMSI#3 are representative of the combination information relating to the MSs 11, 12 and 13, respectively. These combinations stored in the HLR 61 and VLR 72 will each be automatically deleted when, e.g., the corresponding MS is switched off. This part of the procedure will not be described because it is not directly relevant to the understanding of the present invention.

Hereinafter will be described a connection control procedure to be executed when any one of the MSs 11–13 generates a call origination request. First, assume that the MS 11 generates a call origination request. When the user of the MS 11 dials a desired telephone number, the MS 11 selects one of the BTSs 31–33 substantially in the same manner as at the time of registration. Then, the MS 11 sends an originating call signal to the BTS selected, e.g., BTS 31 as illustrated in FIG. 1 over an access channel assigned to the MS 11. The call originating signal contains the other party's telephone number, IMSI1, IMEI1, and other information. The call originating signal is routed through the BTS 31 and BSC 34 to the MSC 81.

On receiving the call originating signal, the MSC 81 searches the registration area of the HLR 61 to see if the information IMSI#1 representative of the IMSI1 and IMEI1 combination is stored. Because the concern's system A is assumed to be a home system for the IMSI1, the MSC 81 finds the information IMSI#1 in the above area of the HLR 61. Then, the MSC 81 executes a procedure for connecting the MS 11 to the destination. So long as the destination exists in the area covered by the home station, the connection is effected via the BSS 30 or 40. When the destination exists in an area covered by a roamer station or when it is a fixed station (wired telephone), the connection is effected via the public telephone network 101. As soon as a conversation between the calling MS 11 and the called station ends, the MSC 81 writes a charge for the call in a charge register defined in the HLR 61 and assigned to the IMEI1.

The above procedure will also be executed when a call origination request is generated by the MS 12, although it will not be described specifically.

When a call origination request is generated by the MS 13 situated at the roamer station, the following procedure is executed. A call originating signal from the MS 13 is sent to the MSC 2 by way of, e.g., the BTS 51 and BSC 53. This part of the procedure will not be described specifically because it is the same as with the request generated by the MS 11. In response to the call originating signal, the MSC 82 searches the HLR 71 to see if the information IMSI#3 representative of the IMSI1 and IMEI3 combination is stored. Because the concern's system B is a roamer system for the IMSI1, the MSC 82 determines that the information IMSI#3 is not stored in the HLR 71. Then, the MSC 82 scans the VLR 72 to determine whether or not the information IMSI#3 is stored. The result of this decision is positive because the concern's system B is a roamer system for the IMSI1. Hence, the MSC 82 connects the MS 13 to a destination in the manner previously described in relation to the MS 11. After a conversation between the MS 11 and the destination, the MSC 82 writes a charge for the call in a charge register defined in the VLR 72 and assigned to the IMSI1.

Thereafter, the charge stored in the VLR 72 and assigned to the IMSI1 is transferred by the communication concern governing the roamer system B to the charge register of the HLR 61 of the home system A and assigned to the IMSI1 over the public telephone network 101. Alternatively, the communication concern governing the roamer system B may directly bill the subscriber having the IMSI1 for the telephone call.

When a call termination request meant for the IMSI1 is generated, a terminating connection procedure is executed, as follows. As for the call termination request meant for the IMSI1, a terminating call signal will arrive at the MSC 81 of the home system A or at the MSC 82 of the roamer system B. As for the MSC 81 of the home system A, the call terminating signal will arrive thereat from an MS covered by the home system A via the BSS 30 or 40, or from the MSC 82 of the roamer system B over the telephone network 101, or from a fixed station over the telephone network 101. On the other hand, as for the MSC 82 of the roamer system B, the call terminating signal will arrive thereat from an MS covered by the roamer system B via the BBS 50, or from the MSC 81 of the home system A over the public telephone network 101.

First, a terminating connection procedure to be executed when a call terminating signal arrives at the MSC 81 of the home system will be described. On receiving the call terminating signal, the MSC 81 searches the HLR 61 to see if combination information, including the other party's IMSI1 contained in the received signal, is stored in the registration area. If the MS 11 has been authenticated and registered at the HLR 61, the combination information IMSI#1 is present in the HLR 61. If the MS 12 or the MS 13 has been authenticated and registered, the combination information IMSI#2 or IMSI#3 is present in the HLR 61. If none of the MSs 11–13 has been authenticated or registered, none of the combination information IMSI#1–IMSI#3 is present in the HLR 61.

If one or more of the combination information IMSI#1–IMSI#3 is present in the registration area of the HLR 61, the MSC 81 calls designated one of the MSs 11–13. This processing depends on the number of the information IMSI#1–IMSI#3 stored in the HLR 61, i.e., one or more than one in this case, as will be described hereinafter.

When one of the above combination information IMSI#1–IMSI#3 exists in the HLR 61, the MSC 81 calls the MS designated by the information. However, if the combination information is IMSI#3 designating the MS 13 which is situated at the roamer station, the MSC 81 inquires, before actually ringing the MS 13, the calling station whether or not it desires to ring the MS 13. This inquiry will prevent the person at the calling station from being wastefully charged when the subject matter of conversation to be held is not urgent or important. Specifically, a suitable inquiry message is sent to the calling station via the talkie device 91. An example of the inquiry message is "The mobile phone you dialed is situated at a roamer station. If you call it, you are expected to pay extra charges for a long distance line and a roamer service. Please push the button 1 to call or the button 2 to cancel." The MSC 81 rings the MS 13 if the button 1 is pushed or does not ring it if the button 2 is pushed. Further, if neither the button 1 nor the button 2 is pushed, the MSC 81 does not ring the MS 13.

On the other hand, when two or more combination information are stored in the registration area of the HLR 61, the MSC 81 cannot select one of the MSs 11–13 which it should ring. In this case, the MSC 81 urges, by using the talkie device 91, the person at the calling station to select desired one of the MSs. For example, there is sent to the calling station a message "The phone number you dialed is shared by the following three mobile phones:

1: phone 11  2: phone 12  3: phone 13

Please choose one of the three mobile phones using the push buttons of your phone. If you do not choose any of them, we will connect you to the mobile phone registered last." Of course, this message will be sent when all the three combination information IMSI#1–IMSI#3 are present in the HLR 61.

When the person at the calling station selects a desired one of the MSs 11–13, the MSC 81 rings the designated MS. However, if the person does not select any of them, the MSC 81 rings the MS registered last.

First, assume that the person at the calling station selects the MS 11 or 12 located at the home station. Then, the MSC 81 sends a terminating call signal to all the BSCs 34 and 42 subordinate thereto. In response, the BSC 34 transfers the terminating call signal to the subordinate BTSs 31–33 over a control channel, and the BSC 42 transfers it to the subordinate BTS 41 over a control channel. As a result, the MS 11 or 12 is called by broadcast.

When the person at the calling station selects the MS 13 located at the roamer station, the MSC 81 sends a terminating call signal to the MSC 82 over the public telephone network 101. In response, the MSC 82 searches the HLR 71 to see if the combination information IMSI#3 containing the destination IMSI1 is present. Because the concern's system B is a roamer system, the information IMSI#3 is not stored in the HLR 71. Next, the MSC 82 determines whether or not the information IMSI#3 is present in the VLR 72. Because the concern's system B is a roamer system and because the information IMSI#3 is stored in the HLR 61 of the home system A, it is also stored in the VLR 72 without fail. The MSC 82, therefore, determines that the information IMSI#3 exists in the VLR 72. Then, the MSC 82 calls the MS 13 designated by the information IMSI#3 by broadcast.

The above description has concentrated on a case wherein the combination information containing the destination IMSI1 is present in the HLR 61. If such information is not stored in the HLR 61, the MSC 81 searches the VLR 62 to see if it is present therein. Because the concern's system A is a home system for the destination IMSI1, the above information is, of course, absent in the VLR 62. On recognizing the absence of the information, the MSC 81 informs the calling station of the fact that the desired IMSI1 is not authenticated or registered at the system A. In this case, the MSC 81 does not send a terminating call signal to the MSC 82 of the roamer station. This is because the fact that the combination information including the IMSI1 is absent in the HLR 61 of the home system A clearly indicates that the same information has not been written to the VLR 72 of the roamer system B.

Assume that a terminating call signal arrives at the MSC 82 of the roamer system B. In this case, the terminating call signal is sent from an MS belonging to the roamer system B or from the home system A, as stated earlier. The following description will concentrate on the arrival of the signal from an MS belonging to the roamer system, because the arrival of the same from the home system A has already been described.

On the receipt of the terminating call signal, the MSC 82 searches the HLR 71 to see if the combination information including the destination IMSI1 contained in the received signal is present. Because the system B is assumed to be a roamer system for the IMSI1, the above combination information is absent in the HLR 71. The MSC 82 recognizing the absence of the information in the HLR 71 scans the VLR 72 to determine whether or not the information is present therein. The information IMSI#3 will be present in the VLR 72 if the MS 13 is registered at the system B or will be absent if otherwise. If the information IMSI#3 is present in the VLR 72, the MSC 82 calls the designated MS 13 by broadcast.

However, if the information IMSI#3 is absent in the VLR 72, the MSC 82 inquires the calling station whether or not the terminating call signal should be transferred to the home system A. This inquiry is implemented by the talkie device 92. If the calling station returns an answer requesting the MSC 82 to transfer the signal to the home system A, the MSC 82 executes the transfer of the signal. Why the signal is transferred to the home system A is that the combination information IMSI#1 or IMSI#2 including the IMSI1 may have been written to the HLR 61. Further, the inquiry as to whether or not to transfer the signal is significant because, otherwise, extra charges for a long distance line and a roamer service should be paid in addition to the usual charge for a call, as stated previously.

When the terminating call signal is transferred from the roamer system B to the home system A, the MSC 81 determines whether or not the combination information including the destination IMSI1 is present in the HLR 61. If such combination information is present in the HLR 61, the MSC 81 rings the MS designated thereby. If otherwise, the MSC 81 searches the VLR 62 to see if the combination information is present therein. Because the system A is a home system for the IMSI1, the above combination information is, of course, not stored in the VLR 62. At this instant, the MSC 81 does not return the call terminating signal to the roamer system B. This is because the absence of the combination information including the IMSI1 in the HLR 61 of the home system A clearly shows that such information is also absent in the VLR 72 of the roamer system B.

The above connection control procedures are each executed in response to a call termination request.

While the foregoing description has assumed a single SIM having the IMSI1 and existing at the roamer station, it may occur that a plurality of such SIMs exist at the roamer station at the same time. Then, on the receipt of a terminating call signal meant for the IMSI1, the MSC 82 at the roamer station B instructs, by using the talkie device 92, the calling station to select desired one of the plurality of SIMs sharing the same IMSI1.

In the above description, an MS having a particular IMSI is assumed to call another MS having a different IMSI. In the illustrative embodiment, it is also possible for one MS to call another MS sharing the same IMSI therewith, as follows. In the foregoing procedures, if the combination information including a destination IMSI contained in a terminating call signal is present in the HLR 61, the MSC 81 rings an MS matching the information. In practice, however, the MSC 81 first determines whether or not the destination IMSI is identical with the IMSI included in the SIM of the calling MS, and then executes the above processing only if the former is different from the latter. If the two IMSIs are identical each other, the MSC 81 executes the following procedure.

When only one combination information (including the destination IMSI contained in the terminating call signal) is present in the HLR 61, the MSC 81 does not execute ringing and informs the calling MS of the unexecution. This is because the above combination information and combination information derived from the terminating call signal are identical. Stated another way, the calling MS is identical with the called or destination MS. When two different combination information are stored in the HLR 61, the MSC 81 calls an MS designated by the combination information different from the combination information derived from the IMSI of the calling MS. However, when the MS to be called is located at the roamer station, the MSC 81 inquires the calling MS whether or not to actually ring the designated MS. Only if the calling MS requests the MSC 81 to ring the other MS, the MSC 81 rings it, i.e., transfers the terminating call signal to the roamer system B. Further, when three or more different combination information are stored in the HLR 61, the MSC 81 commands the calling MS to select one of the MSs and then rings the MS selected.

For example, assume that the MS 11 calls another MS sharing the same IMSI. Then, if only the combination information IMSI#1 is present in the HLR 61, the MSC 81 does not execute calling, but it simply informs the calling MS 11 of the unexecution. If the combination information IMSI#1 and the combination information IMSI#2 or IMSI#3 are stored in the HLR 61, the MSC 81 calls the MS 12 or 13 corresponding to the information IMSI#2 or IMSI#3. Again, before actually ringing the MS 13, the MSC 81 inquires the calling MS 11 whether or not to execute ringing and executes it only if the MS 11 returns a positive answer. Further, when all the three combination information IMSI#1–IMSI#3 are present in the HLR 61, the MSC 81 causes the calling MS 11 to select one of the MSs 12 and 13, and then rings the MS selected.

As for the MSC 82, when the combination information including the destination IMSI contained in a terminating call signal is present in the VLR 72, the MSC 82 determines whether or not the destination IMSI of the terminating call signal is identical with the IMSI of the calling MS. Only if the two IMSIs are different from each other, the MSC 82 executes the previously stated procedure. If they are identical and if only one combination information is present in the VLR 72, the MSC 82 does not execute ringing because the calling MS and the destination MS are identical. In this case, the MSC 82 inquires the calling MS whether or not to transfer the terminating call signal to the home station and transfers it to the home station if the MSC 82 receives a positive answer. This is because combination information including the destination IMSI contained in the terminating call signal may have been registered at the home station.

When two different combination information are present in the VLR 72, the MSC 82 calls an MS corresponding to the combination information different from the combination information derived from the IMSI of the calling MS. If three or more combination information are stored in the VLR 72, the MSC 82 causes the calling MS to select one of the MSs and then rings the MS selected.

In the embodiment described above, the concern's system A acts as a home system while the concern's system B acts as a roamer system. As for an IMSI, however, the concern's system and the roamer system act as a roamer system and a home system, respectively. In this case, the above procedure will also be executed although not described specifically in order to avoid redundancy.

The embodiment described above has various unprecedented advantages as enumerated below.

(1) When an authentication and registration request is generated, the information representative of the combination of an IMSI and an IMEI is held. Subsequently, on the generation of a call origination or termination request, whether or not combination information relating to the request is held is determined. Only if it is held, a call origination or termination service is provided. Hence, even when a plurality of SIMs sharing the same IMSI are used at the same time, they can be distinguished from each other. It follows that when one member of a family, for example, goes out with one of the SIMs, the other members can also receive telephone services while avoiding an overlapping minimum charge particular to the prior art. Moreover, the SIMs sharing the same IMSI can be used at the same time.

(2) Assume that when a call termination request is generated, a plurality of MSs having the same destination IMSI have been authenticated and registered. Then, the calling person is urged to select desired one of the MSs and is, therefore, free from wasteful calls. While particular one of the plurality of MSs may be automatically called in accordance with a preselected rule, this kind of scheme is likely to ring an MS other than the desired MS.

When the calling person is urged to select a desired MS, as in the embodiment, the person may hesitate about the selection unless he or she is aware of the persons using the MSs to select. Therefore, it is necessary for the user of the individual MS to inform all other persons expected to ring him or her that he or she is the user of the individual MS. In practice, however, the neglect of this requirement matters little because, e.g., a plurality of MSs are rarely switched on at the same time, because a plurality of MSs are rarely present in a communicable zone at the same time, because the number of times of call termination is smaller than the number of times of call origination, and because a person travelling with an MS and needing call termination usually voluntarily requests the other party to call him or her at the telephone number of the MS specified beforehand.

(3) If a plurality of MSs sharing the same IMSI have been authenticated and registered at the time when a call termination is generated, the calling person is instructed to select desired one of the MSs. If the MS at which a call should be terminated is located at a roamer station, the calling person is inquired whether or not to transfer a terminating call signal to the roamer station. This is because the transfer of the terminating call signal from a home station to a roamer station would result in a wasteful charge if the subject matter of conversation were not urgent or important.

In a conventional system, when a subscriber is receiving a roamer service, a terminating call signal arrived at a home station is unconditionally transferred to a roamer station. This requires extra charges for a long distance line and a roamer service in additional to the usual charge for a call. Hence, the calling person, believing that the other party is located at a home station, must pay an unexpected charge despite that the subject matter of conversation is not urgent or important.

In the embodiment described above, the calling person can determine whether or not to transfer the terminating call signal to the roamer station. The embodiment is, therefore, free form the above problem.

(4) When a terminating call signal is generated at a roamer station, the calling person is inquired whether or not to transfer the signal to a home station. This also successfully achieves the advantage stated in the above item (3).

(5) When a call termination request is generated, whether or not the destination telephone number included in a terminating call signal and the IMSI of the calling MS are identical is determined. If they are identical, the call is dealt with as a call among MSs sharing the same IMSI. This permits not only MSs having different IMSIs but also MSs having the same IMSI to communicate with each other.

In summary, in accordance with the present invention, a communication system holds information representative of the combinations of subscriber identities and equipment identities, determines, on the generation of a communication service request, whether or not there is the combination information relative to the request, and provides the service only if the information exists. Hence, even when a plurality of subscriber identity media sharing the same subscriber identify information are used at the same time, they can be distinguished from each other. This eliminates the previously discussed problems of the conventional system and, in addition, permits a plurality of subscriber identity media sharing a single subscriber identity information to be used at the same time.

While the present invention has been described with reference to the particular illustrative embodiment, it is not to be restricted by the embodiment but only by the appended claims.

It is to be appreciated that those skilled in the art can change or modify the embodiment without departing from the scope and spirit of the present invention. For example, when the calling station does not select a desired MS despite that it is instructed to do so, the embodiment automatically rings an MS authenticated and registered last without regard to whether or not it is situated at a roamer station. Alternatively, the calling station may be instructed to select one of only the MSs located at the home station. This will prevent a terminating call signal from being transferred to the roamer station when the calling station neglects the selection by accident. The present invention is applicable even to a mobile phone system in which subscribers are identified by a medium other than a card. Further, the present invention is also applicable to a mobile communication system other than the mobile phone system or even to a communication system other than a mobile communication system.

What is claimed is:

1. A communication system using a subscriber identity medium to which subscriber identity information is assigned, for determining whether or not a person to be provided with a communication service is a subscriber on the basis of said medium, said system comprising:

information holding means for holding a plurality of combination information representative of combinations of the subscriber identity information and terminal identity information for identifying a communication terminal to which the medium is mounted, said plurality of combination information each including the same subscriber identity information and disparate terminal identity information; and service providing means for providing said communication service only if combination information relating to said communication service is held by said information holding means, wherein when said service providing means further simultaneously provides a plurality of communication services corresponding to said plurality of combination information even though each combination information includes the same subscriber identity information and disparate terminal identity information.

2. A system as claimed in claim 1, wherein when a communication service for calling the communication terminal is requested by means of specifying the subscriber identity information, said service providing means instructs, if a plurality of combination information each including the same subscriber identity information to be specified are held by said information holding means, a terminal requesting said communication service to select a single terminal to be called.

3. A system as claimed in claim 1, wherein when a plurality of communication terminals calling are simultaneously provided with said communication services by said service providing means, said plurality of combination information related to said plurality of communication terminals each include the same subscriber identity information and disparate terminal identity information.

4. A system as claimed in claim 1, wherein when a plurality of communication terminals to be called are simultaneously provided with said communication services by said service providing means, said plurality of combination information related to said plurality of communication terminals each include the same subscriber identity information and disparate terminal identity information.

5. A communication system comprising:

a first communication terminal comprising:
a first subscriber identity medium comprising first subscriber identity information; and
first terminal identity information for identifying the first communication terminal;

a second communication terminal comprising:
a second subscriber identity medium comprising said first subscriber identity information; and
second terminal identity information for identifying the second communication terminal;

information holding means comprising:
first combination information comprising said first subscriber identity information and said first terminal identity information; and
second combination information comprising said first subscriber identity information and said second terminal identity information; and service providing means for simultaneously providing communication service to said first and second communication terminals.

* * * * *